United States Patent [19]

Kassakian

[11] 4,415,962
[45] Nov. 15, 1983

[54] CURRENT MODE SINE WAVE INVERTER

[75] Inventor: John G. Kassakian, Newton, Mass.

[73] Assignee: Massachusetts Institute of Technology, Cambridge, Mass.

[21] Appl. No.: 274,006

[22] Filed: Jun. 15, 1981

[51] Int. Cl.³ .......................................... H02M 7/537
[52] U.S. Cl. .................................... 363/131; 323/222; 363/134
[58] Field of Search .................... 323/222; 363/27, 96, 363/97, 131, 134, 135

[56] References Cited
U.S. PATENT DOCUMENTS

| | | | |
|---|---|---|---|
| 4,186,437 | 6/1980 | Cox | 363/16 |
| 4,257,090 | 3/1981 | Kröger et al. | 323/222 |

OTHER PUBLICATIONS

Chang, "Application of ASCR in 40-kHz Sine-Wave Converter," Intelec 79 Conference Paper, pp. 100–107, Wash. D.C. 26–29, Nov. 1979.

*Primary Examiner*—William H. Beha, Jr.
*Attorney, Agent, or Firm*—Arthur A. Smith, Jr.; Thomas J. Engellenner

[57] ABSTRACT

A sine wave inverter consisting of two substantially constant dc current sources and two transistors to switch the current flow in a load from one branch of the circuit to the other branch, in which the two branches are designed to produce complementary sinsoidal waveforms and thereby provide the load with ac current.

9 Claims, 14 Drawing Figures

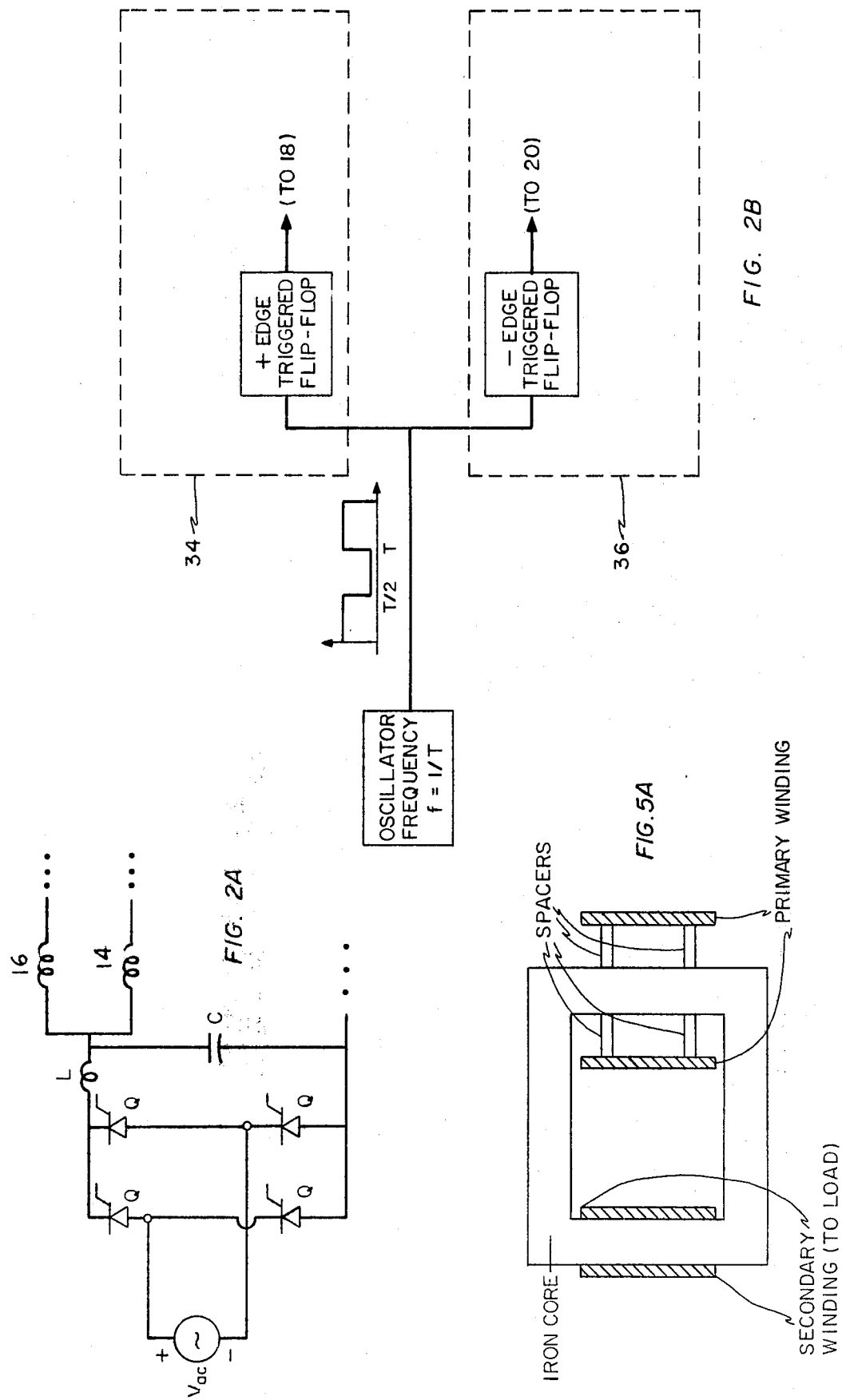

CURRENT MODE SINE WAVE INVERTER

INTRODUCTION

This invention relates generally to dc to ac inverters and, more particularly, to dc to ac inverters which provide substantially sinusoidal outputs.

BACKGROUND OF THE INVENTION

Direct current (dc) to alternating current (ac) inverters are finding considerable use in industrial applications whenever an ac source independent of utility power is needed. In particular, where low levels of electromagnetic noise and/or very high frequencies are required, sinusoidal inverters are needed. One example of the use of such inverters is in the field of high frequency induction heating for case hardening of machine parts. Inverters are also finding increased use in utility-interactive systems where dc generators, such as solar arrays, seek to contribute their excess power to the utility grid.

It is known in the art that a dc to ac inverter for providing a substantially sinusoidal output can be constructed by employing switches which, when open, interrupt the connection of a constant voltage source to a resonant tank circuit. Such techniques are described in the article by N. Mapham entitled "An SCR Inverter with Good Regulation and Since Wave Output", *IEEE Transactions on Industry and General Applications*, Vol. IGA-3, No. 2, March/April 1967, which article describes such a voltage mode, or series, inverter.

The voltage mode inverter has certain unsatisfactory characteristics. For example, the most effective configurations for voltage mode inverters, such as that referenced above, require that the switches carry current in both directions. Hence, a fast, and a relatively expensive, diode must be employed in parallel with each switch, the diode being arranged to carry the reverse current. Moreover, damping circuits in parallel with each switch are usually necessary to suppress transients and to limit the rate of rise of voltage across an opening switch. Additionally, the common half-bridge voltage mode circuit requires a center-tapped voltage source, usually approximated by two large, and relatively expensive capacitors connected in series and placed in parallel with a single voltage source. It should also be noted that, when silicon controlled rectifiers (SCRs) are used as switches in such voltage mode inverters, the frequency of the sinusoidal output is limited to an upper range of about 30 kHz.

Thus, there exists a need for a less expensive sinewave inverter which uses components which are less susceptible to damage or failure and which is capable of performing in a wide variety of industrial applications and, particularly, in high frequency applications.

BRIEF SUMMARY OF THE INVENTION

The sine wave inverter configuration of the invention utilizes two current (as opposed to voltage) sources, i.e. two sources which provide substantially constant currents, rather than constant voltages. Such current sources are employed to create complementary sinusoids which can be combined with greater ease to produce an ac output waveform. Rather than interrupting current flow to the resonant tank circuit by opening a switch, as is done in present practice with voltage mode inverters, switching means in the inverter of the invention interrupt tank circuit excitation when they are closed. In one embodiment of the current mode configuration of the invention, for example, a voltage source can be employed together with two inductances to form the current sources, thus eliminating the need for large capacitors. Additionally, the switching sequence of the current mode inverter eliminates the need for damping circuits and the power losses associated therewith. Moreover, because the switching means in the configuration of the invention are not required to carry current in both directions, no parallel diodes are required for such purpose. The inverter also permits higher frequency operation than that permitted by the prior art voltage mode inverters and is well suited for use in induction heating applications, for example.

The invention will be described below in connection with a preferred embodiment thereof. It is understood, however, that those skilled in the art may modify such embodiment in various ways within the scope and spirit of the invention as claimed.

BRIEF DESCRIPTION OF THE DRAWINGS

The invention can be described in more detail in connection with the accompanying drawings wherein:

FIG. 2A is a schematic diagram of a current controlling circuit for use in connection with the embodiment of FIG. 2.

FIG. 2B is a schematic diagram of a switch timing circuit for use in connection with the embodiment of FIG. 2.

FIG. 5A is a schematic drawing of a high leakage transformer which may be employed with the invention.

DETAILED DESCRIPTION OF THE PREFERRED EMBODIMENT

Figure 1:
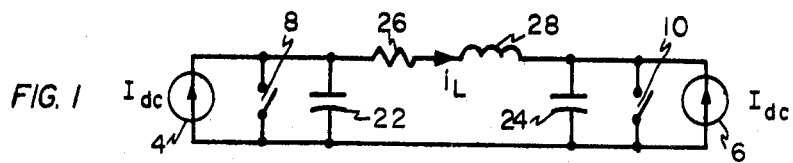
FIG. 1 shows an illustrative inverter configuration in accordance with the invention.

FIG. 1 shows a basic configuration of the current mode, sine wave inverter of the invention. As can be seen therein, such configuration includes a first current source 4 and a second current source 6, each supplying a first substantially constant current. First switching means 8 and second switching means 10 are connected in parallel across current sources 4 and 6, respectively. The current sources are connected to a load shown schematically as load resistance 26 having an inductance 28 in series therewith. The load resistor 26 is illustrative only and it is understood that any load to which a sinusoid output is applied can be used.

Figure 3:
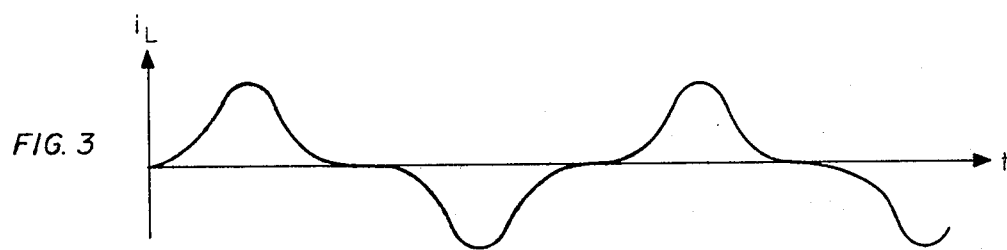
FIG. 3 is a graph of the current flowing through the load in FIG. 1 as a function of time for a discontinuous conduction operating mode.
Figure 3A:
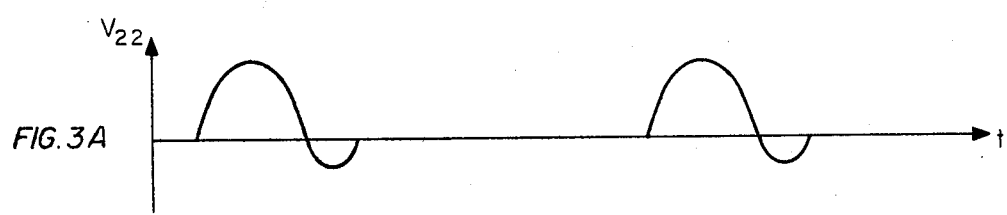
FIG. 3A is a graph of the voltage across capacitor 22 in FIG. 2 as a function of time.
Figure 3B:
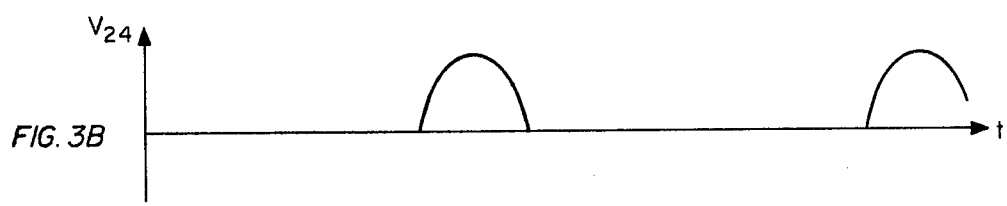
FIG. 3B is a graph of the voltage across capacitor 24 in FIG. 2 as a function of time.
Figure 3C:
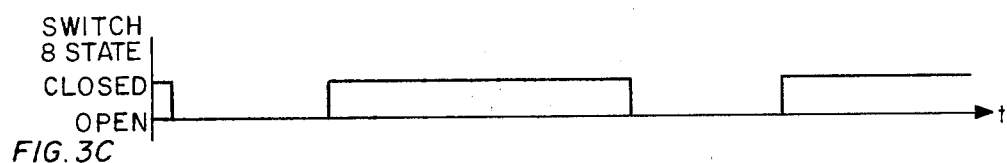
FIG. 3C is a graph of the state of switch 8 in FIG. 2 as a function of time.
Figure 3D:
FIG. 3D is a graph of the state of switch 10 in FIG. 2 as a function of time.

If switching means 8 and 10 are initially closed, the circuit is activated by first opening one of the switches as, for example, switch 8. The substantially constant current is supplied to the resonant circuit formed by capacitances 22 and 24, inductance 28 and load 26 so that the load current, $i_L$, builds up sinusoidally, as shown in FIG. 3. The voltage $V_{22}$ across capacitor 22 executes a complete but decaying sinusoidal cycle, as shown in FIG. 3A, at the completion of which switch 8 closes. Switch 10 is then closed to provide a complementary sinusoidal cycle, as shown in FIG. 3 and in FIG. 3B for capacitance 24. FIGS. 3C and 3D show the open and closed states of the switches 8 and 10, respectively. The switches are thereupon opened and closed in sequence, and depicted therein, so that a discontinuous sinusoidal current output, as shown in FIG. 3 is produced.

Figure 4:
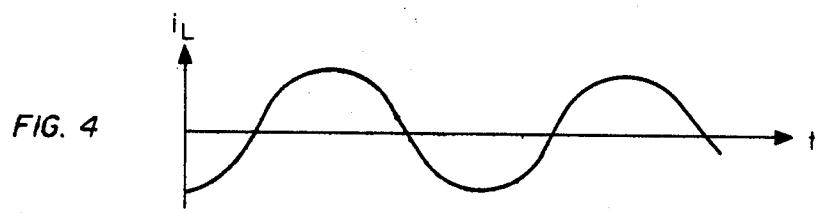
FIG. 4 is a graph of the current flowing through the load in FIG. 2 as a function of time for a continuous conduction operating mode.
Figure 4A:
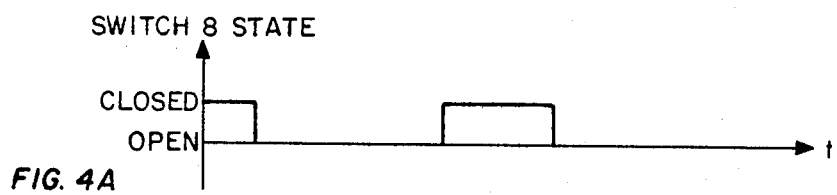
FIG. 4A is a graph of the base drive to a transistor in FIG. 2 as a function of time during such continuous conduction mode.
Figure 4B:
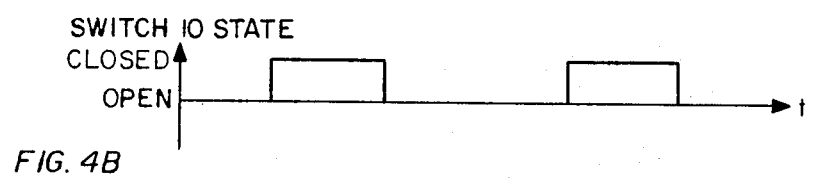
FIG. 4B is a graph of the base drive to another transistor in FIG. 2 as a function of time during such continuous conduction mode.

A continuous sinusoidal output current, $i_L$, as shown in FIG. 4, can be provided by controlling the switching times in the manner depicted in FIGS. 4A and 4B wherein the times at which such switches are open are arranged to overlap.

Figure 2:
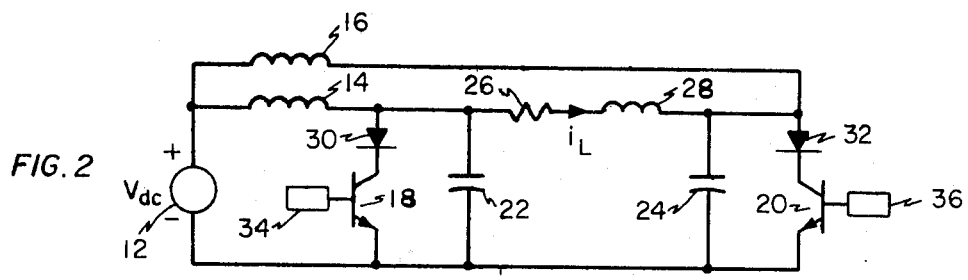
FIG. 2 shows a preferred embodiment of the general configuration of FIG. 1, wherein the current sources are approximated by a voltage source and two inductors.

FIG. 2 shows a preferred embodiment of the invention which represents a particular implementation of the general configuration shown in FIG. 1. Such embodiment utilizes a voltage source 12 connected to two inductors 14 and 16, as shown, to create two virtual constant current sources and transistors 18 and 20 as the switching means. The transistors serve to switch the current flow in the load from one branch of the circuit to the other. The times at which the transistors 18 and 20 turn on are determined by circuit behavior, assuming base drive control is present, as shown by base drive control circuits 34 and 36. The times at which the transistors turn off are determined by such base drive control.

If transistors 18 and 20 are initially turned on and transistor 18 turns off (i.e., the switching means effectively opens), the load current $i_L$ builds up sinusoidally in the same manner as shown in FIG. 3. The voltage across capacitor 22 executes a complete but decaying sinusoidal cycle (as in FIG. 3A) at the completion of which transistor 18 re-closes. Transistor 20 is next turned off and a complementary sinusoidal cycle occurs, as shown in FIG. 3 and FIG. 3B. A discontinuous sinusoidal output current $i_L$ is achieved if the transistors are controlled in the manner shown in FIGS. 3C and 3D. A continuous sinusoidal output current, $i_L$, as shown in FIG. 4, can be achieved by controlling the transistor switches in such a manner that their open times overlap in the manner shown in FIGS. 4A and 4B.

A unique characteristic of the circuit of FIG. 2 is that base drive may be applied to transistors 18 and 20 while their respective collector-emitter voltages are negative. The transistors will not turn or until their respective collector-emitter voltage reaches zero. During the time this voltage is negative, however, the base drive will establish a store of minority carriers in the base region of the transistor, with the result that when the voltage reaches zero, the transistor will turn on very quickly. This is what is meant by the turn on times being controlled by circuit behavior, assuming base drive is present, as mentioned above. Turn on losses, therefore, will be very small.

At turn off, each of the transistors 18 and 20 sees zero volts across its respective capacitor. Thus, with proper construction techniques to minimize lead inductance there will be no voltage transient associated with turn off and accompanying losses will be small.

Diodes 30 and 32 are coupled to transistors 18 and 20, respectively, to block reverse voltages. The diodes 30, 32 in the inverter are never subjected to a reverse recovery transient since they are not required to block at turn off. This operating condition, combined with the fact that the transistors are turning on into a voltage rising from zero at the fundamental frequency, means that the diodes 30, 32 need to meet only modest dynamic requirements compared with those in a conventional voltage mode inverter operating at the same frequency. Since the current at turn off in the inverter of the invention is controlled by the transistors 18 and 20 and the rate of rise of voltage across the switching means is limited by the fundamental sinusoidal waveform, turn off losses are low and damping is not required.

Base drive control circuitry including suitable timing means can be readily devised by those in the art to achieve the switching operations shown in FIGS. 3C and 3D and FIGS. 4A and 4B. In FIG. 2B a suitable timing circuit is shown comprising an oscillator and complementary one-shot flip-flop devices, each having a time constant $\tau$. For open-time overlap operation, $\tau$ should be chosen to be less than half the oscillator period; for no overlap $\tau$ should be greater than T/2. The oscillator frequency may also be varied to adjust the power delivered to the load. Timing means to achieve these functions are commercially available. See, generally, Chapter 7 of National Semiconductor Corp.'s *Linear Databook* (1980) or the description of the LM555 timer in Morris and Miller, *Designing with TTL Integrated Circuits*, Texas Instruments Inc., (McGraw Hill 1970).

Figure 5:
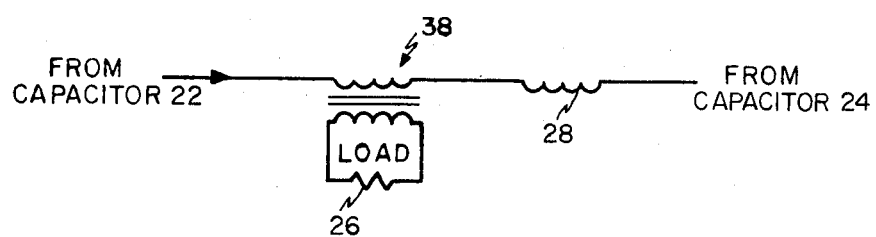
FIG. 5 shows an alternative configuration for the load portions of FIGS. 1 and 2.

Although FIG. 1 shows the load 26 placed directly in series with the inductor 28, in practice the load would most likely be coupled to the inverter through a transformer, as shown in FIG. 5, for example, which depicts the load portion of the circuits of FIGS. 1 or 2. Thus, the inductance 28 is in series with the primary of transformer 38, the load 26 being connected across the secondary thereof. In such a configuration a high leakage transformer design can be arranged so as to integrate the inductor 28 with the primary winding, resulting in a single magnetic component in the circuit. In FIG. 5A a high leakage transformer which integrates the resonant inductor 28 with its isolation function is shown schematically. The transformer windings are typically arranged to provide a leakage inductance by separating them from the transformer core by spacers. See, generally, pp. 69–72 of Blume et al., *Transformer Engineering* (2nd Ed. Wiley 1951).

To verify the operational characteristics of the inverter of the invention, a 10–20 kHz, 250 W circuit was built and tested using the configuration of FIG. 2. Two sets of tank circuit components were chosen to present characteristic impedances of 25.2Ω and 12.6Ω at 10 and 20 kHz, respectively. At these nominal frequencies the ratio of the driving frequency, $f_o$ to the resonant frequency $$\frac{1}{\sqrt{LC}},$$

$f_r$, was about 0.87 in both cases. For the same output power, therefore, device peak current at 20 kHz was twice that at 10 kHz, and device peak voltage was half that at 10 kHz.

The values of the circuit components used in a specific embodiment of FIG. 2 for the above tests are given below in Table I:

TABLE I

|  |  | 10 kHz | 20 kHz |
| --- | --- | --- | --- |
| transistors | 18, 20 | 2N6339 | 2N6339 |
| diodes | 30, 32 | 1N3913 | 1N3913 |
| inductors | 14, 16 | 9.6 mH | 9.6 mH |
| inductor | 28 | 350 µH | 87.5 µH |
| capacitors | 22, 24 | 0.55 µF | 0.55 µF |

The results of such tests shows that excellent sine wave generation was achieved. No damping was required, either for suppressing transients or for switching locus control.

It is clear that the power delivered to the load can be controlled by varying the value of the currents supplied by the constant current sources or by varying the frequency at which the switching means are switched. In FIG. 2A a full-wave, phase controlled bridge is shown schematically as a means to control the current. Control circuits to achieve this function are commercially available. See generally, General Electric Co., *SCR Manual* (6th Ed. 1979). Bridge circuits are shown in FIG. 9.4 of the *SCR Manual* and circuit details for providing control pulses to the thyristors Q are discussed in Sections 9.6 and 9.7.1 of the reference.

What is claimed is:
1. An inverter comprising:
    (a) first and second means each producing a substantially constant dc current;
    (b) first and second switching means connected in parallel with the first and second dc current producing means, respectively;
    (c) first and second capacitance means connected in parallel with the first and second switching means, respectively;
    (d) load means connected to said first and second current producing means;
    (e) inductance means coupled to said load means; and
    (f) means for controlling the operation of said first and second switching means so that said switching means operate sequentially, whereby current through the load means executes a sinusoidal cycle when the first switching means is opened and a complementary sinusoidal cycle when the second switching means is opened.

2. An inverter in accordance with claim 1 wherein said first and second dc current producing means comprise
    means for producing a dc voltage;
    first and second inductance means connected to said dc voltage producing means, the output of each said inductance means effectively providing a constant current.

3. An inverter in accordance with claim 1 wherein said first and second switching means comprise first and second transistors, respectively, and further include first and second diodes in series with the first and second transistors, respectively, the diodes serving to block reverse voltage.

4. An inverter in accordance with claim 1 wherein said control means includes means for timing the operations of said switching means so that the periods during which the first and second switching means are open overlap whereby a continuous sinusoidal output is produced.

5. An inverter in accordance with claim 1 wherein said control means includes means for timing the operations of said switching means so that the periods during which the first and second switching means are open do not overlap whereby a discontinuous sinusoidal output is produced.

6. An inverter in accordance with claim 1 wherein the power delivered to the load means is controlled by varying the value of the current provided by said dc current providing means.

7. An inverter in accordance with claim 1 wherein the power delivered to the load means is controlled by varying the frequency at which the switching means are switched.

8. An inverter in accordance with claims 1, 2, 3, 4, 5, 6 or 7 wherein the load means comprises a transformer having its primary winding connected between the outputs of the first and second current producing means and its secondary winding connected to a load element, the inductance means connected to the load means being connected in series with said transformer primary winding.

9. An inverter in accordance with claim 8 wherein the inductance means in series with said transformer primary winding is integrally formed with said transformer and said transformer is arranged to have a high leakage inductance.

* * * * *